United States Patent Office 3,546,271
Patented Dec. 8, 1970

3,546,271
PROCESS FOR THE PRODUCTION OF
AMINEACETONITRILES
Edward E. Harris, Niagara Falls, N.Y., assignor to Hooker
Chemical Corporation, Niagara Falls, N.Y., a corporation of New York
No Drawing. Filed June 27, 1968, Ser. No. 740,484
Int. Cl. C07c *121/42, 121/44*
U.S. Cl. 260—465.5          9 Claims

ABSTRACT OF THE DISCLOSURE

There is described a process for the preparation of compounds of the formula: $H_bN(CH_2CN)_c$, wherein $b$ is from 0 to 2, $c$ is from 1 to 3, and the sum of $b$ plus $c$ is 3, comprising reacting a compound of the formula: $H_dN(CH_2SO_3H)_e$, wherein $d$ is from 0 to 2, $e$ is from 1 to 3, and the sum of $d$ plus $e$ is 3, with hydrogen cyanide and with formaldehyde.

---

This invention relates to a novel process for the production of amineacetonitriles.

There has been discovered an improved process for the production of nitrilotriacetonitrile. In said improved process aminomethylenesulfonic acid, hydrogen cyanide and formaldehyde are reacted.

Processes are known in which inorganic compounds, such as ammonia or sulfamic acid, are reacted with hydrogen cyanide and formaldehyde to form nitrilotriacetonitrile. Numerous other processes have been suggested for the preparation of nitrilotriacetonitrile, but few of these are processes which are commercially feasible for continuous production at high yields.

In accordance with the present invention there is provided a process for the preparation of compounds of the formula: $H_bN(CH_2CN)_c$, wherein $b$ is from 0 to 2, $c$ is from 1 to 3, and the sum of $b$ plus $c$ is 3, comprising reacting a compound of the formula: $H_dN(CH_2SO_3H)_e$, wherein $d$ is from 0 to 2, $e$ is from 1 to 3, and the sum of $d$ plus $e$ is 3, with hydrogen cyanide and with formaldehyde.

Because of its availability, the preferred starting material is aminomethylenesulfonic acid; $H_dN(CH_2SO_3H)_e$, wherein $d$ is 2 and $e$ is 1. In said case, the yield of nitrilotriacetonitrile increases and the yield of glycinonitrile and iminodiacetonitrile decreases to a certain point as the moles of formaldehyde and hydrogen cyanide per mole of aminomethylenesulfonic acid in the reaction mixture increases.

Because of the commercial importance of nitrilotriacetonitrile, the preferred process is for the preparation of $H_bN(CH_2CN)_c$, wherein $b$ is 0 and $c$ is 3. In said case, it is preferred to use from about 3 to about 6 moles, preferably from about 3.6 to about 4.5 moles of hydrogen cyanide per mole of aminomethylenesulfonic acid, and about 2 to about 4, preferably from about 2.4 to about 3 moles of formaldehyde per mole of aminomethylenesulfonic acid.

Though the process of this invention is operable at a reaction temperature of from about zero to about 100 degrees centigrade, it is preferred to use a reaction temperature of from about 30 to about 90 degrees centigrade, and a reaction temperature of from about 50 to about 70 degrees centigrade is even more preferred.

In the preferred process of this invention one may use any concentration of aminomethylenesulfonic acid, hydrogen cyanide and formaldehyde in aqueous solutions as reactants.

It does not matter whether one uses unstabilized or stabilized formaldehyde in the production of nitrilotriacetonitrile (the latter has some methanol in it to preclude formation of the aldehyde polymer and to prevent formaldehyde from precipitating out of solution at low temperatures); both work equally well in the process of this invention.

Hydrogen cyanide may be added to the reaction mixture through any system that produces hydrogen cyanide, although preferably it is added as an aqueous solution of hydrocyanic acid.

The preferred reaction mixture initially comprises hydrogen cyanide, formaldehyde, water and aminomethylenesulfonic acid. As the reaction progresses the reaction mixture comprises compounds of the formula

$$H_bN(CH_2CN)_c$$

wherein $b$ and $c$ are as hereinbefore described, along with by-product sulfurous acid.

To some extent, the yield is dependent on the total reaction time, the reaction time being defined as the time of adding the reactants plus the time of reacting. The process of this invention is operable when the total reaction time is from about one hour to about twelve hours, and it is even more preferred to use a total reaction time of from about two to about six hours. Generally, the longer the reaction time the higher the yield but beyond a certain point the increase in reaction time does not result in a significant increase in yield.

When aminomethylenesulfonic acid, hydrogen cyanide and formaldehyde are reacted to produce nitrilotriacetonitrile, a wide variation in the order of addition and reaction sequence were used without any significant effect on conversions and yields, provided that equivalent concentrations of formaldehyde and hydrogen cyanide were maintained.

In the process of the instant invention, nitrilotriacetonitrile may be removed from the reaction mixture by conventional solid-liquid separation methods such as settling, filtering or centrifuging, and the remaining liquor which contains any unreacted starting compounds may be further mixed with an additional charge of formaldehyde, hydrogen cyanide and aminomethylenesulfonic acid.

The liquor remaining after the separation of nitrilotriacetonitrile contains a valuable by-product of the reaction, sulfurous acid. The remaining liquor may be neutralized with sufficient alkali metal hydroxide, such as sodium hydroxide, potassium hydroxide or lithium hydroxide, to produce a solution of the corresponding alkali metal salt of sulfurous acid, such as sodium bisulfite, potassium bisulfite or lithium bisulfite. The alkali metal bisulfite may then be reacted with formaldehyde and ammonium hydroxide to form the alkali metal salt of aminomethylenesulfonic acid. Acidification of the salt of aminomethylenesulfonic acid results in the precipitation of the starting material, aminomethylenesulfonic acid, which is separated by a conventional solid-liquid separation method.

By the continuous addition of aminomethylenesulfonic acid, hydrogen cyanide and formaldehyde to a reaction vessel, and the continuous withdrawal and reuse of the sulfurous acid by-product, a continuous process may be established which essentially requires only the addition of readily available starting products such as formaldehyde, hydrocyanic acid, ammonium hydroxide and an alkali metal hydroxide.

The following examples are illustrative of the invention, and are not to be deemed limitative thereof. Unless otherwise stated, parts are by weight and temperatures are in degrees centigrade.

EXAMPLE 1

A reactor was charged with 55.5 parts of aminomethylenesulfonic acid, 43.7 parts of water, and 40.3 parts of liquid hydrocyanic acid. The mixture was maintained at a temperature of about 30 degrees centigrade as 122 parts of a solution containing 37 percent formaldehyde were added over a one hour period. The mixture was warmed to 70 degrees centigrade for a period of six hours, and then cooled to room temperature. The solid which was filtered off and dried had a melting point of 124 degrees centigrade to 126 degrees centigrade. It was nitrilotriacetonitrile.

EXAMPLE 2

A reactor was charged with 111 parts of aminomethylenesulfonic acid, 100 parts of water, and 203 parts of 37 percent Formalin. At 50 degrees centigrade there was added 94.5 parts of liquid hydrocyanic acid over a three hour period. The mixture was then warmed to 70 degrees centigrade and held for four hours. The yield of glycinonitrile was 38 parts.

EXAMPLE 3

The reaction was carried out as in Example 1 except that 81 parts of liquid hydrocyanic acid were used. The yield of product, nitrilotriacetonitrile (melting point 125 degrees centigrade to 126 degrees centigrade) was 53.0 parts.

EXAMPLE 4

A reactor was charged with 55.5 parts of aminomethylenesulfonic acid, 89.1 parts of liquid hydrocyanic acid, and 150 parts of the filtrate from Example 1. At 30 degrees centigrade 129.6 parts of an aqueous solution containing 37 percent formaldehyde were added over a one hour period. The mixture was then warmed to 70 degrees centigrade for six hours and cooled to room temperature. The solid product was filtered off and dried. 60.4 parts of nitrilotriacetonitrile were obtained.

EXAMPLE 5

A reactor is charged with 150 parts of the filtrate from Example 1. Sodium hydroxide is added to the filtrate in sufficient quantity to neutralize the acid filtrate. To the mixture 40 parts of formaldehyde and 150 parts of a 15 percent aqueous solution of ammonium hydroxide are added. After a period of reaction, the mixture is acidified with sulfuric acid, and the precipitated aminomethylenesulfonic acid that forms is filtered out of the mixture.

Although certain embodiments of the invention have been disclosed for the purpose of illustration, it will be evident that various changes, modifications may be made without departing from the spirit and scope of this invention.

What is claimed is:
1. A process for the preparation of compounds of the formula:

$$H_bN(CH_2CN)_c$$

wherein $b$ is from 0 to 2, $c$ is from 1 to 3, and the sum of $b+c$ is 3, comprising reacting in the liquid phase a compound of the formula:

$$H_dN(CH_2SO_3H)_e$$

wherein $d$ is from 0 to 2, $e$ is from 1 to 3, and the sum of $d+e$ is 3, with hydrogen cyanide and formaldehyde, wherein about 3 to about 6 moles of hydrogen cyanide and about 2 to about 4 moles of formaldehyde are used per mole of said sulfonic acid.

2. A process in accordance with claim 1 wherein $e$ is equal to 1 and $d$ is equal to 2.

3. A process in accordance with claim 2 wherein $b$ is equal to 0 and $c$ is equal to 3.

4. A process in accordance with claim 3 wherein the temperature is from about zero degrees centigrade to about 100 degrees centigrade.

5. A process in accordance with claim 1 wherein the temperature is from about 30 degrees centigrade to about 90 degrees centigrade.

6. A process in accordance with claim 5 wherein from about 3.6 to about 4.5 moles of hydrogen cyanide and about 2.4 to about 3 moles of formaldehyde are used per mole of aminomethylenesulfonic acid.

7. A process in accordance with claim 4 wherein:
(a) nitrilotriacetonitrile is recovered; and
(b) a remaining liquor is mixed with an additional charge of the reactants of claim 4.

8. A process in accordance with claim 4:
(a) nitrilotriacetonitrile is recovered; and
(b) a remaining liquor comprising by-product sulfurous acid is neutralized to form a bisulfite, reacted with formaleyhde and ammonium hydroxide to produce a salt of aminomethylenesulfonic acid, and acidified to produce aminomethylene sulfonic acid.

9. A process in accordance with claim 6 wherein:
(a) nitrilotriacetonitrile is continuously recovered from the reaction mixture;
(b) the remaining liquor comprising by-product sulfurous acid is continuously withdrawn, neutralized to form a bisulfite, reacted with formaldehyde and ammonium hydroxide to produce a salt of aminomethylenesulfonic acid, and acidified to produce aminomethylenesulfonic acid; and
(c) said aminomethylenesulfonic acid produced in step
(b) plus additional reactants of claim 6 are continuously added to the reaction mixture.

References Cited

FOREIGN PATENTS 851,783  10/1960  Great Britain _____ 260—465.5

JOSEPH P. BRUST, Primary Examiner

U.S. Cl. X.R.

23—130; 260—513